United States Patent [19]
Abiru

[11] Patent Number: 5,881,065
[45] Date of Patent: *Mar. 9, 1999

[54] DATA TRANSFER SWITCH FOR TRANSFERRING DATA OF AN ARBITRARY LENGTH ON THE BASIS OF TRANSFER DESTINATION

[75] Inventor: Ken-ichi Abiru, Tokyo, Japan

[73] Assignee: Ultra-High Speed Network and Computer Technology Laboratories, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 580,144

[22] Filed: Dec. 28, 1995

[30] Foreign Application Priority Data

Oct. 4, 1995  [JP]  Japan ..................................... 7-257578
Oct. 6, 1995  [JP]  Japan ..................................... 7-259896

[51] Int. Cl.$^6$ .................................................. H04L 12/54
[52] U.S. Cl. ...................................... 370/413; 395/200.68
[58] Field of Search ............................... 395/200.15, 311, 395/858, 200.68; 370/396, 412, 422, 413

[56] References Cited

U.S. PATENT DOCUMENTS

| | | | |
|---|---|---|---|
| 4,706,240 | 11/1987 | Payne, III | 370/80 |
| 4,731,878 | 3/1988 | Vaidya | 359/165 |
| 5,091,905 | 2/1992 | Amada | 370/415 |
| 5,260,905 | 11/1993 | Mori | 365/230.05 |
| 5,267,235 | 11/1993 | Thacker | 370/396 |
| 5,475,383 | 12/1995 | Ohta et al. | 370/382 |
| 5,513,321 | 4/1996 | Katori | 370/412 |
| 5,517,495 | 5/1996 | Lund et al. | 370/414 |
| 5,581,709 | 12/1996 | Ito et al. | 395/858 |
| 5,613,069 | 3/1997 | Walker | 370/355 |

FOREIGN PATENT DOCUMENTS

| | | |
|---|---|---|
| 61-145995 | 7/1986 | Japan . |
| 62-098842 | 5/1987 | Japan . |
| 62-247653 | 10/1987 | Japan . |
| 63-067047 | 3/1988 | Japan . |
| 01071237 | 3/1989 | Japan . |
| 02179141 | 7/1990 | Japan . |
| 03019543 | 1/1991 | Japan . |
| 03108837 | 5/1991 | Japan . |
| 03187547 | 8/1991 | Japan . |
| 03235449 | 10/1991 | Japan . |
| 05083297 | 4/1993 | Japan . |
| 05167605 | 7/1993 | Japan . |
| 06062031 | 3/1994 | Japan . |
| 06090233 | 3/1994 | Japan . |
| 072978740 | 11/1995 | Japan . |
| 07321814 | 12/1995 | Japan . |

OTHER PUBLICATIONS

Proceedings of the 1994 IEICE Fall Conference, High Performance LAN Switch Using ATM technology Seiji Ohishi et al, p. 333.

*Primary Examiner*—Eddie P. Chan
*Assistant Examiner*—Gary J. Portka
*Attorney, Agent, or Firm*—Blakely Sokoloff Taylor & Zafman

[57] ABSTRACT

A data transfer switch includes a switch controller and a selector switch unit. The switch controller selects one of transfer requests having the same output accommodation unit serving as a transfer destination from all transfer requests output from the input accommodation units, outputs a selector control signal, as data to be transferred to a transfer destination output accommodation unit, the selector control signal designating to select data from a transfer source input accommodation unit, and outputs a transfer permission to the transfer source input accommodation unit. The selector switch unit selects, on the basis of the selector control signal output from the switch controller, one of data output from the input accommodation units as data to be transferred to each output accommodation unit, connects the transfer source input accommodation unit to the transfer destination output accommodation unit in a one-to-one correspondence, and transfers the data from the transfer source input accommodation unit to the transfer destination output accommodation unit in accordance with the transfer permission in one direction.

9 Claims, 13 Drawing Sheets

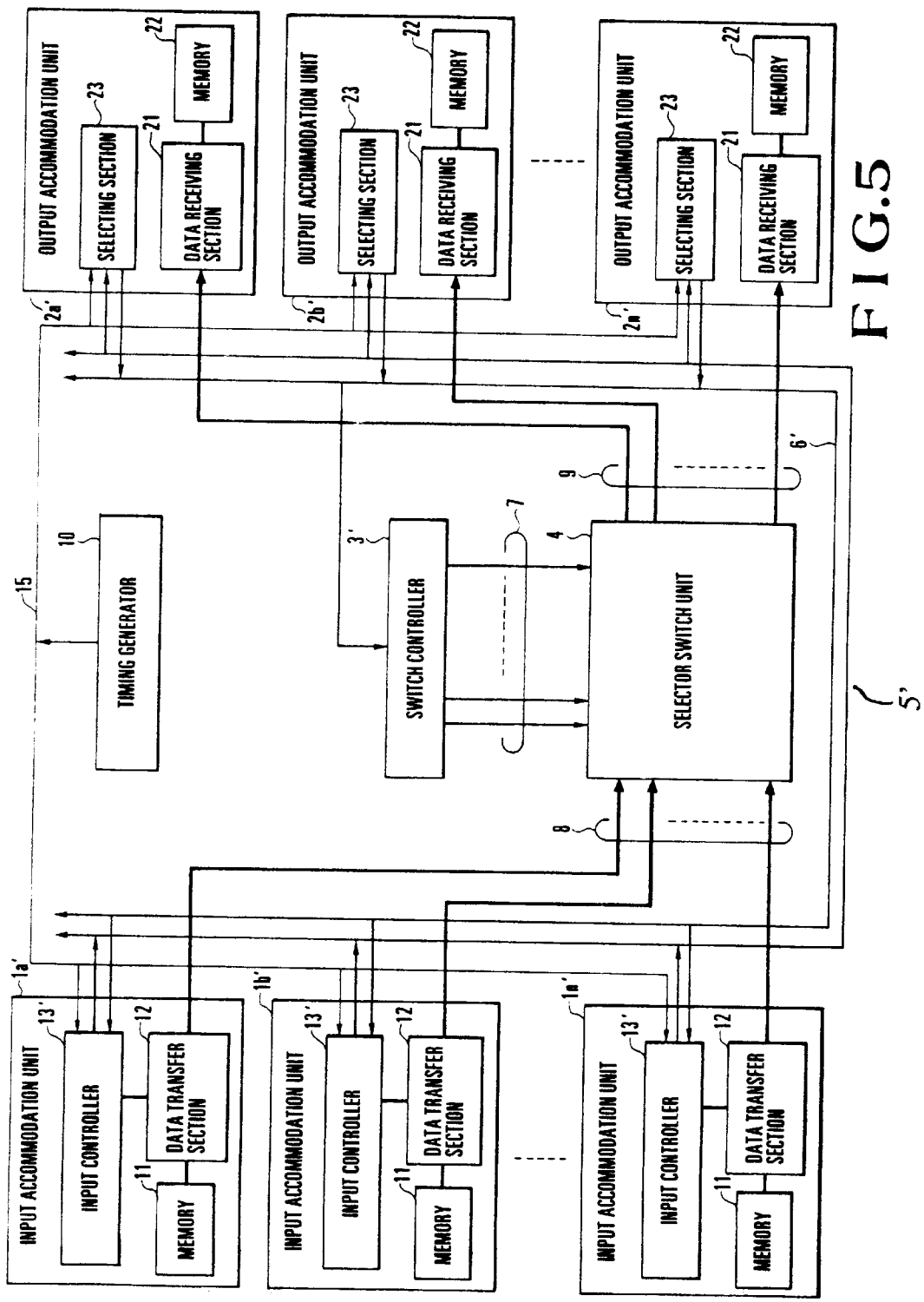
F I G. 5

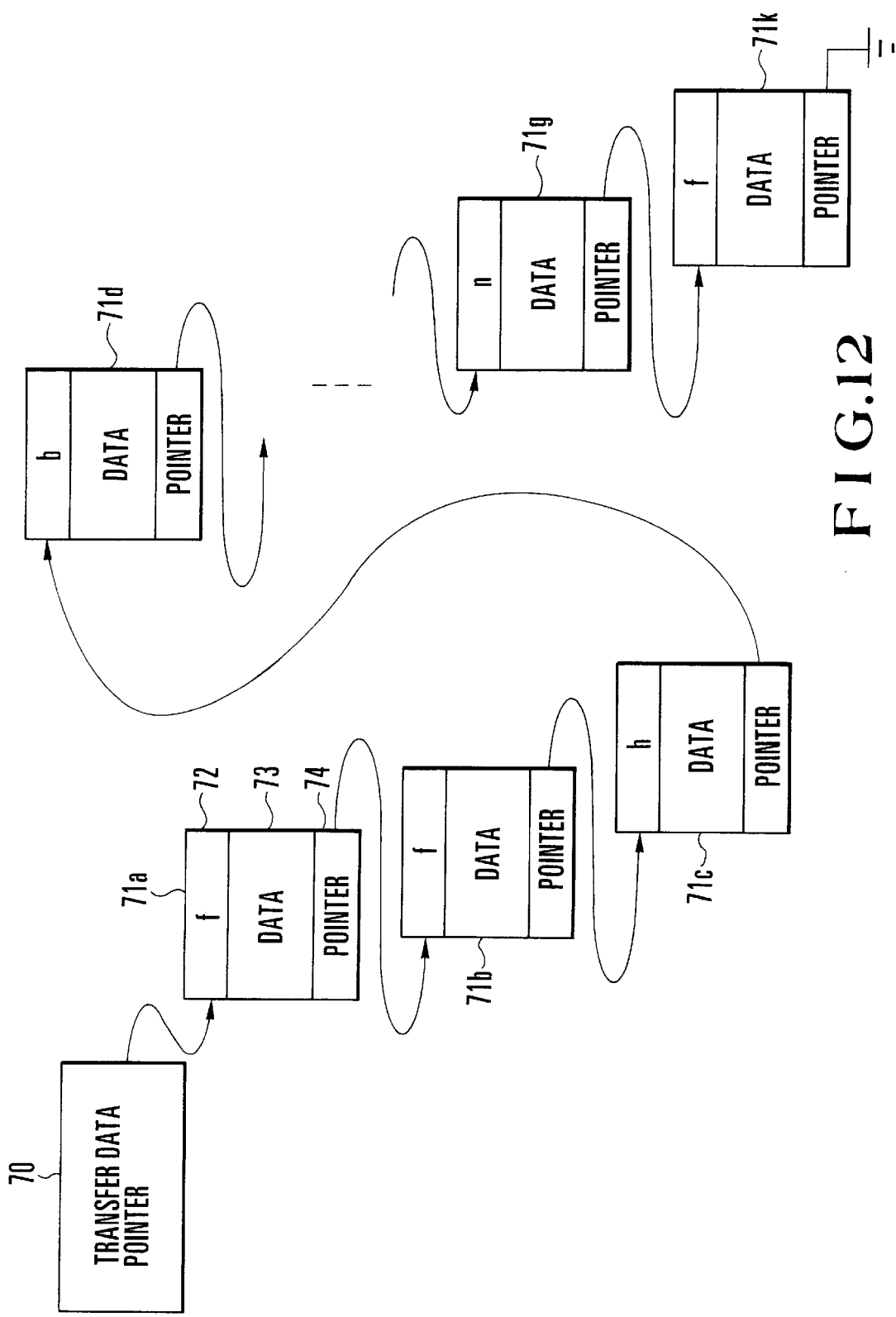
F I G. 12

DATA TRANSFER SWITCH FOR TRANSFERRING DATA OF AN ARBITRARY LENGTH ON THE BASIS OF TRANSFER DESTINATION

BACKGROUND OF THE INVENTION

The present invention relates to a data transfer switch and, more particularly, to a data transfer switch for transferring and outputting data of an arbitrary length input from a predetermined input accommodation unit to a predetermined output accommodation unit.

A conventional data transfer switch having a plurality of input accommodation units (input ports) and output accommodation units (output ports) to transfer data of an arbitrary length from an arbitrary input accommodation unit to an output accommodation unit through a predetermined medium (physical medium) has an arrangement shown in FIG. 13.

In input accommodation units 101a to 101n, transfer requests 105a to 105n are output from input controllers 113 to a system bus controller 103 to request data transfer through a medium, i.e., a system bus 104 in response to external data write access to memories 111.

In response to these transfer requests, the system bus controller 103 checks the use state of the system bus 104 and outputs transfer permissions 106a to 106n to the input controllers 113 to permit data transfer if the system bus 104 is free.

Upon reception of the transfer permissions 106a to 106n, the input controllers 113 designate the start of data transfer to data transfer sections 112. The data transfer sections 112 read out data from the corresponding memories 111 and output the readout data onto the system bus 104.

In output accommodation units 102a to 102n, data receiving sections 121 receive data of the corresponding ports from the system bus 104 and write them in corresponding memories 122, thereby completing the data transfer. The data are externally read out from the memories 122 at subsequent predetermined timings.

In this conventional data transfer switch, the plurality of input accommodation units and the plurality of output accommodation units share the medium (physical medium), i.e., the system bus 104. To use this medium, the transfer requests are arbitrated or scheduled in accordance with predetermined rules, thereby performing data transfer between an arbitrary input accommodation unit and an arbitrary output accommodation unit. For this reason, the sum of output transfer rates capable of outputting data from the respective input accommodation units and the sum of input transfer rates capable of receiving data by the respective output accommodation units are limited by the data transfer rate of this physical medium (electrical transfer rate of the physical medium). When the data output transfer rate of each input accommodation unit and the data input transfer rate of each output accommodation unit come close to the data transfer rate of the medium, the numbers of input and output accommodation units are undesirably limited.

Another conventional switch is also proposed to increase the data transfer rate of the medium itself. In this switch, a tag representing an output destination is imparted to data in an input accommodation unit, and data are distributed at an intersection constituting a transfer switch on the basis of the tag. With this arrangement, when a plurality of data for the same destination simultaneously reach the intersection, a data loss occurs. To avoid this, a queue buffer must be arranged to perform contention control. The buffer capacity is undesirably increased with an increase in the number of intersections.

SUMMARY OF THE INVENTION

It is the first object of the present invention to provide a data transfer switch in which input and output accommodation units need not share a medium, the output and input transfer rates of each input accommodation unit and each output accommodation unit can be increased to the transfer rate of the medium, and a data loss occurring in the transfer switch can be suppressed.

It is the second object of the present invention to provide a data transfer switch capable of connecting a corresponding pair of input and output accommodation units in a one-to-one correspondence with relative small hardware.

It is the third object of the present invention to provide a data transfer switch in which the number of signal lines input to and output from each input accommodation unit can be reduced to suppress an increase in hardware.

It is the fourth object of the present invention to provide a data transfer switch in which an information volume exchanged between the respective control buses can be reduced to allow high-speed transfer control, and the switch can cope with an increase in the number of accommodation units.

It is the fifth object of the present invention to provide a data transfer switch in which a predicted maximum number of selecting sections need not be prepared, and hardware can be reduced to a scale corresponding to the actual number of accommodation units.

It is the sixth object of the present invention to provide a data transfer switch in which a common signal generator is used to suppress an increase in hardware.

It is the seventh object of the present invention to provide a data transfer switch capable of more efficiently transferring data even if a transfer request from an arbitrary input accommodation unit is queued for a transfer permission due to generation of a large number of transfer requests for any one of the output accommodation units as a transfer destination.

It is the eighth object of the present invention to provide a data transfer switch free from complicated transfer request control in each input accommodation unit, such as a temporary stop of remaining transfer requests in response to a transfer permission to any one of the transfer requests when transfer requests for a plurality data are individually output.

It is the ninth object of the present invention to provide a data transfer switch which performs stable arbitration processing without being localized in the selecting sections for the switch controller.

In order to achieve the above objects of the present invention, there is provided a data transfer switch having a plurality of input accommodation units and a plurality of output accommodation units to transfer data of an arbitrary length input from an arbitrary input accommodation unit to a predetermined output accommodation unit on the basis of transfer destination information, comprising switch control means for selecting one of transfer requests having the same output accommodation unit serving as a transfer destination from all transfer requests output from the input accommodation units, outputting a selector control signal, as data to be transferred to a transfer destination output accommodation unit, the selector control signal designating to select data from a transfer source input accommodation unit, and outputting a transfer permission to the transfer source input accommodation unit, and selector switch means for selecting, on the basis of the selector control signal output from the switch control means, one of data output from the input accommodation units as data to be transferred to each output accommodation unit, connecting the transfer source input accommodation unit to the transfer destination output accommodation unit in a one-to-one correspondence, and transferring the data from the transfer source input accommodation unit to the transfer destination output accommodation unit in accordance with the transfer permission in one direction.

BRIEF DESCRIPTION OF THE DRAWINGS

FIG. 5 is a block diagram of a data transfer switch according to the second embodiment of the present invention;

FIG. 12 is a view for explaining a data string in a memory in an input accommodation unit.

DESCRIPTION OF THE PREFERRED EMBODIMENTS

The present invention will be described with reference to the accompanying drawings.

Figure 1:
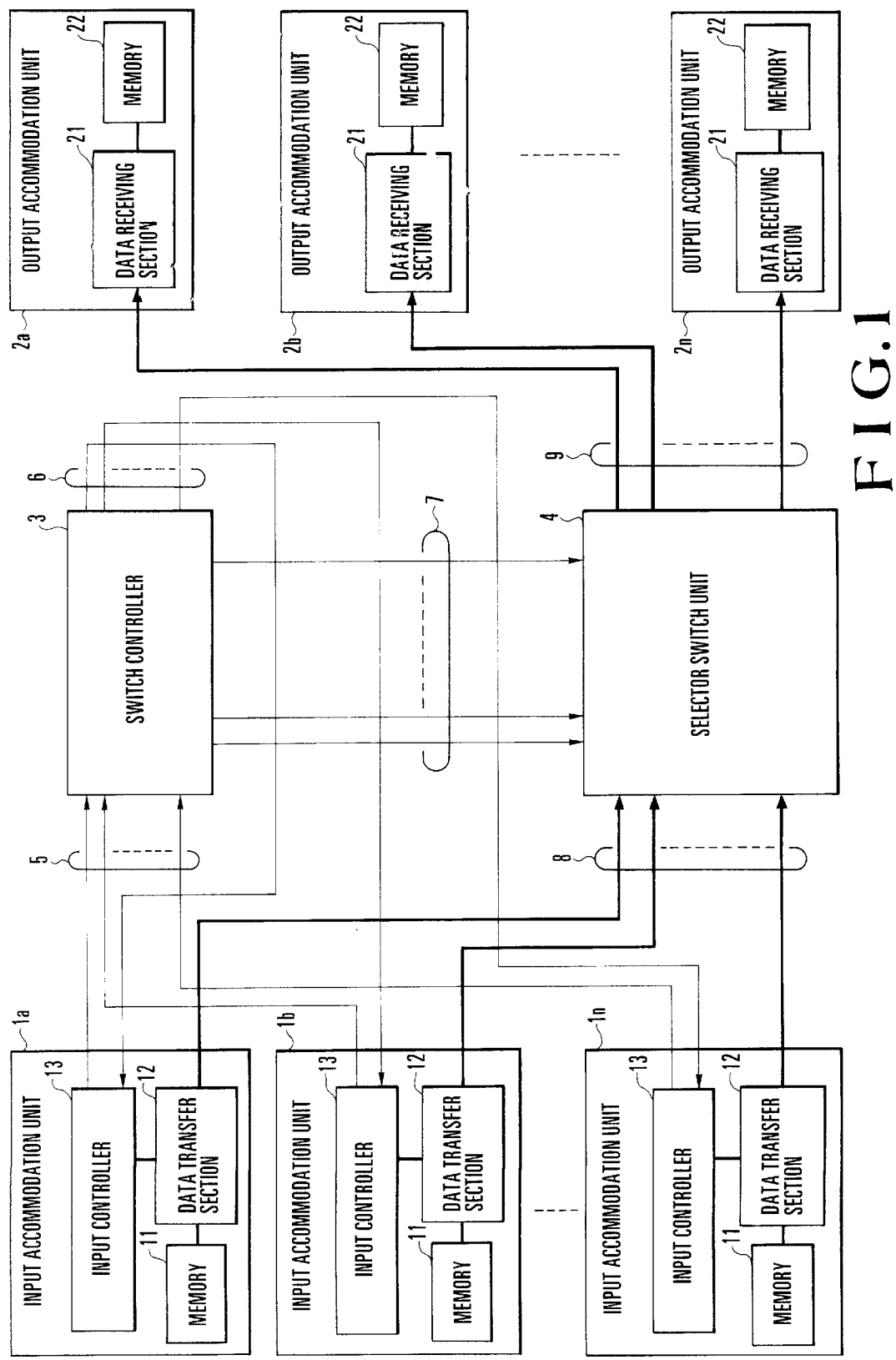
FIG. 1 is a block diagram of a data transfer switch according to the first embodiment of the present invention.

FIG. 1 shows a data transfer switch according to the first embodiment of the present invention. Referring to FIG. 1, reference numerals $1a$ to $1n$ denote input accommodation units; $2a$ to $2n$, output accommodation units; 3, a switch controller for selecting one of transfer requests 5 from the input accommodation units $1a$ to $1n$ for each of the output accommodation units $2a$ to $2n$ to output a transfer permission 6, and outputting a predetermined selector control signal 7; and 4, a selector switch unit for selecting one of the input accommodation units for each of the output accommodation units $2a$ to $2n$ on the basis of the selector control signal 7 and connecting the selected input accommodation unit to the selected output accommodation unit.

In each of the input accommodation units $1a$ to $1n$, reference numeral 11 denotes a memory for temporarily holding external input data; 12, a data transfer section for outputting the data from the memory 11 as readout data 8 to the selector switch unit 4; and 13, an input controller for outputting the transfer request for requesting data transfer to the switch controller 3 and causing the data transfer section 12 to designate the start of data transfer in response to the transfer permission 6.

In each of the output accommodation units $2a$ to $2n$, reference numeral 21 denotes a data receiving section for receiving data 9 output from the selector switch unit 4; and 22, a memory for temporarily holding the data received by the data receiving section 21 until external memory access is performed.

Figure 2:
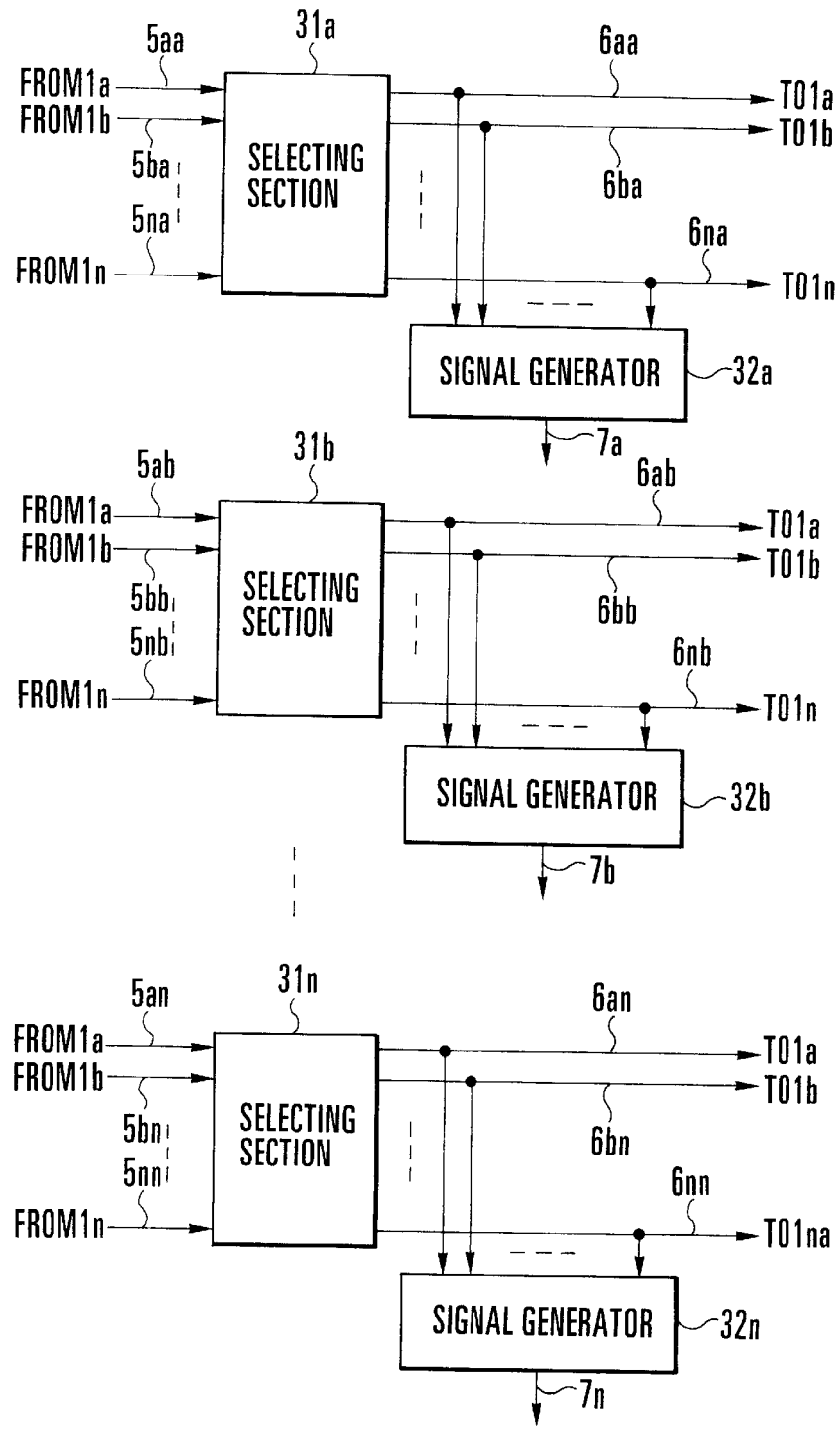
FIG. 2 is a block diagram showing a switch controller.

FIG. 2 shows the arrangement of the switch controller. Referring to FIG. 2, reference numerals $31a$ to $31n$ denote selecting sections arranged in correspondence with the output accommodation units $2a$ to $2n$ to each detect transfer requests from the input accommodation units $1a$ to $1n$ for the output accommodation units $2a$ to $2n$, select one of the transfer requests, and output a transfer permission to the selected one of the input accommodation units $1a$ to $1n$; and $32a$ to $32n$, signal generators arranged in correspondence with selecting sections $31a$ to $31n$ to code the transfer permissions, thereby generating selector control signals $7a$ to $7n$.

For example, in FIG. 2, the selecting section $31a$ corresponds to the output accommodation unit $2a$. Transfer requests $5aa$ to $5na$ having the output accommodation unit $2a$ as the data transfer destination are input from the input accommodation units $1a$ to $1n$ to the selecting section $31a$.

The selecting section $31a$ uniquely manages the transfer requests $5aa$ to $5na$ having the output accommodation unit $2a$ as the data transfer destination and selects one of the transfer requests $5aa$ to $5na$. The selecting section $31a$ outputs a corresponding one of transfer permissions $6aa$ to $6an$ to a corresponding one of the input accommodation units $1a$ to $1n$ which has output the selected one of the transfer requests $5aa$ to $5na$.

The signal generator $32a$ receives a corresponding one of the transfer requests $6aa$ to $6an$ which is output from the selecting section $31a$, codes the selected one of the transfer permissions $6aa$ to $6na$, and generates and outputs the selector control signal $7a$ to the selector switch unit 4.

As described above, the switch controller 3 has identical arrangements for all the output accommodation units $2a$ to $2n$. Note that the transfer request $5an$ and the transfer permission $6an$ are output from the input accommodation unit $1a$ having the output accommodation unit $2n$ as the data transfer destination.

Figure 3:
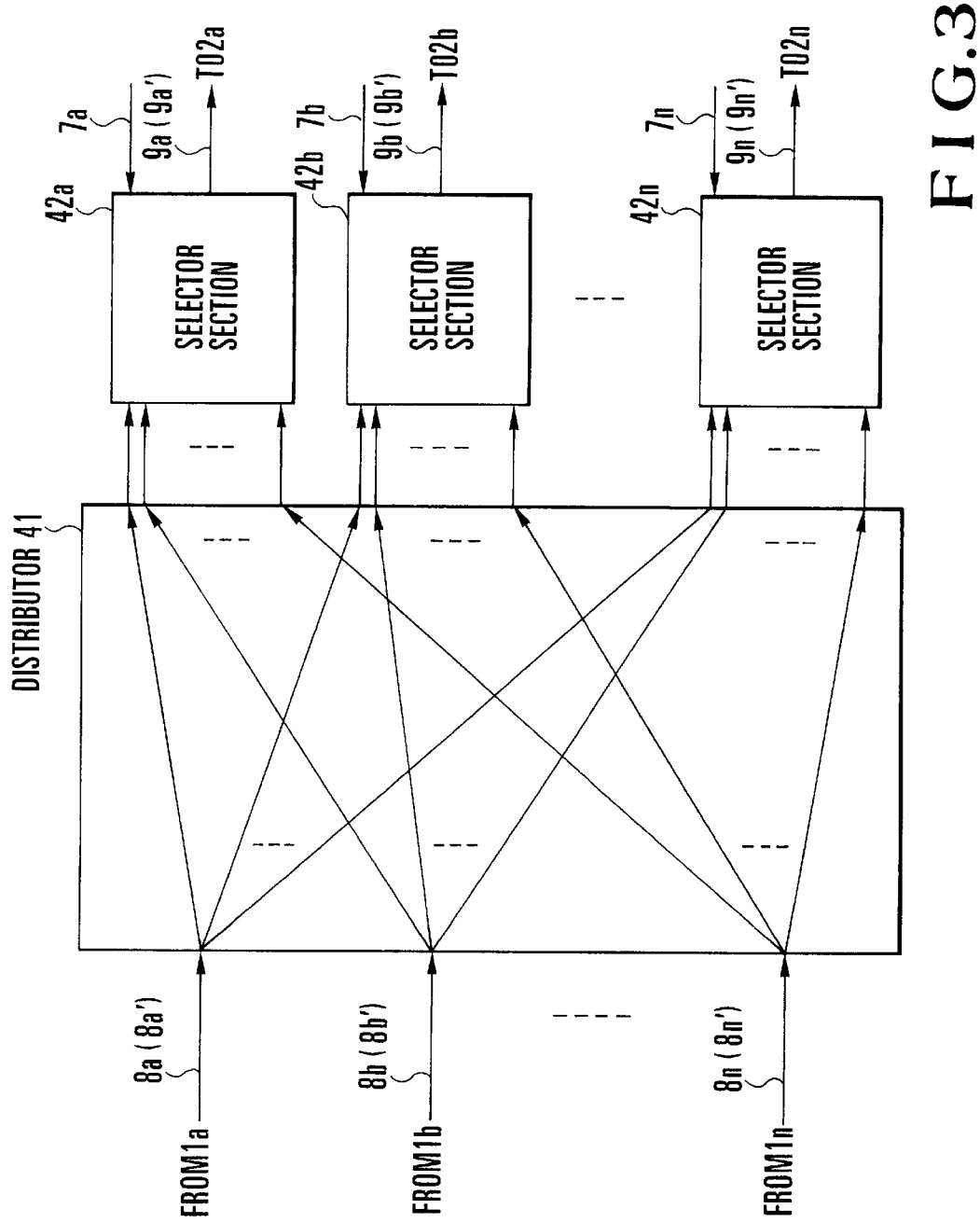
FIG. 3 is a block diagram showing a selector switch unit.

FIG. 3 shows the arrangement of the selector switch unit 4. Referring to FIG. 3, reference numeral 41 denotes a distributor for distributing the data $8a$ to $8n$ output from the input accommodation units $1a$ to $1n$ to the output accommodation units $2a$ to $2n$. Reference numerals $42a$ to $42n$ are selector sections each for selecting one of the data $8a$ to $8n$ distributed for the output accommodation units $2a$ to $2n$ by the distributor 41 on the basis of a corresponding one of the selector control signals $7a$ to $7n$ from the switch controller 3, and outputting the selected data as a corresponding one of data $9a$ to $9n$ to the corresponding one of the output accommodation units $2a$ to $2n$.

The operation of the data transfer switch according to an embodiment of the present invention will be described with reference to FIG. 4.

Figure 4:
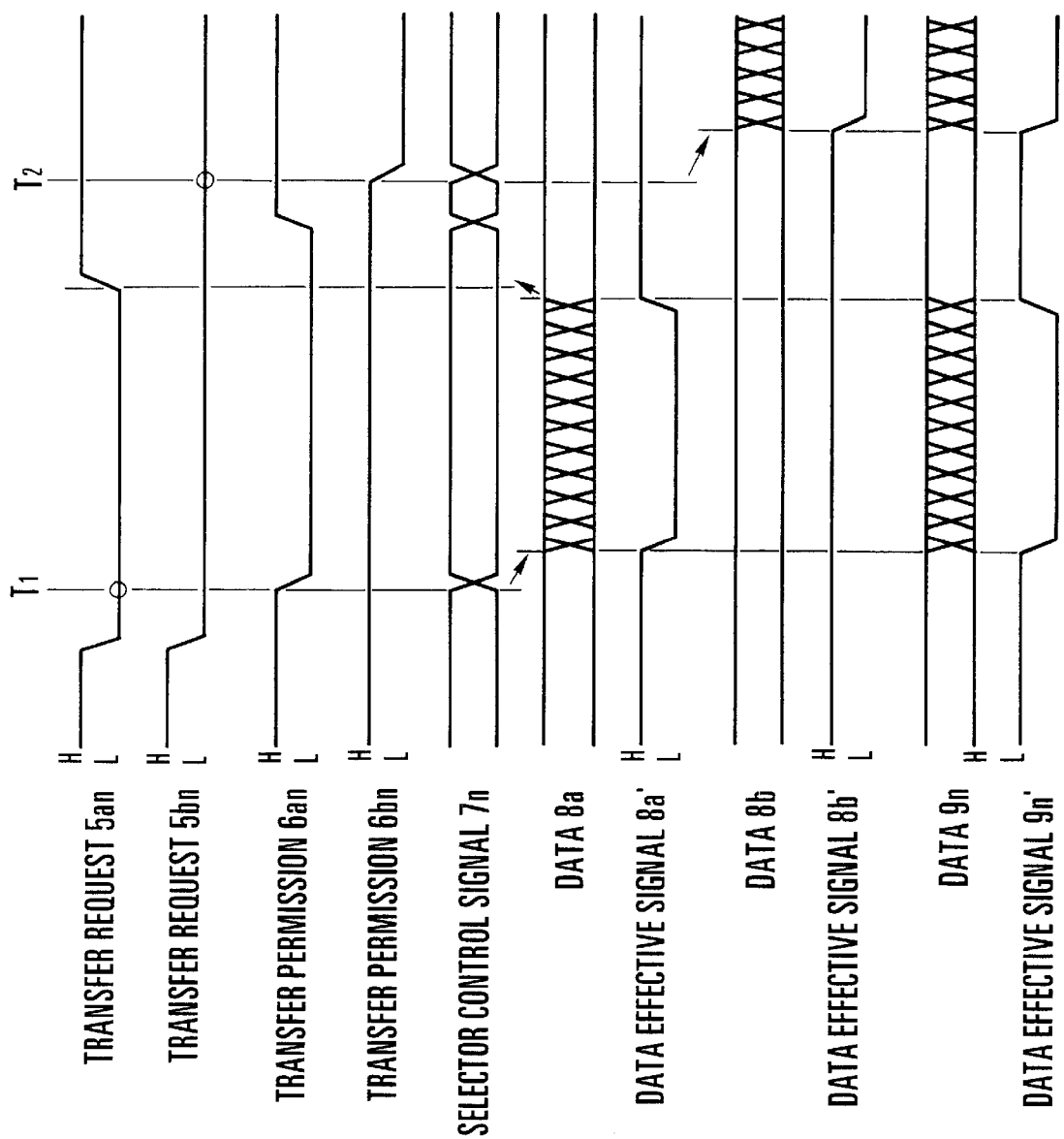
FIG. 4 is a timing chart showing the operation of the data transfer switch.

FIG. 4 shows the operation of the data transfer switch. The same reference numerals as in FIGS. 2 and 3 denote the same parts in FIG. 4.

Reference numerals $8a'$, $8b'$, and $9n'$ denote data effective signals representing the effective periods of the data $8a$, $8b$, and $9n$. The data effective signals $8a'$, $8b'$, and $9n'$ are output from the input accommodation units $1a$ and $1b$, and the selector section $42n$, respectively, as in the data $8a$, $8b$, and $9n$.

When arbitrary external data is written in the memory 11 of the input accommodation unit 1a, the input controller 13 detects the transfer destination of the data through the data transfer section 12.

For example, if the transfer destination is the output accommodation unit 2n, the transfer request 5an (active ="L" level) having the output accommodation unit 2n as the transfer destination is output from the input controller 13.

When external data having the output accommodation unit 2n as the transfer destination is written in the memory 11 of the input accommodation unit 1b, a transfer request 5bn (active="L" level) having the output accommodation unit 2n as the transfer destination is output from the input controller 13 of the input accommodation unit 1b.

In this case, the transfer requests 5an and 5bn output from the input accommodation units 1a and 1b have the output accommodation unit 2n as the transfer destination, they are input to the selecting section 31n (see FIG. 2).

The selecting sections 31a to 31n of the switch controller 3 always monitor the transfer requests having the corresponding output accommodation units 2a to 2n, respectively. In particular, the selecting section 31n monitors the transfer requests 5an to 5nn output from the input accommodation units 1a to 1n which have the output accommodation unit 2n as the transfer destination and outputs a corresponding transfer permission upon detection of any one of the transfer requests.

When a plurality of transfer requests, e.g., the transfer requests 5an and 5bn having the same transfer destination, one of the transfer requests is selected.

At time $T_1$, when the selecting section 31n detects the transfer requests 5an and 5bn and selects the transfer request 5an, the selecting section 31n outputs the transfer permission 6an (active="L" level) to the input accommodation unit 1a serving as the request source. In this case, other transfer permissions 6bn to 6nn are not output (inactive="H" level).

These transfer permissions 6an to 6nn are also input to the signal generator 32n. The output states of the transfer permissions 6an to 6nn are coded and output as the selector control signal 7n to the corresponding selector section 42n of the selector switch unit 4 (see FIG. 3).

In response to this selector control signal 7n, the selector section 42n controls the internal switch to select one of the data 8a to 8n from the distributor 41 as the data 9 to the output accommodation unit 2n, thereby connecting the input and output accommodation units.

When the transfer permission 6an is output as described above, the data 8a from the input accommodation unit 1a is selected on the basis of the selector control signal 7n.

On the other hand, the input controller 13 of the input accommodation unit 1a which have detected the transfer permission 6an outputs a transfer start instruction to the corresponding data transfer section 12. The data 8a is then output from the data transfer section 12. At the same time, the data effective signal 8a' (active="L" level) representing the effective period of the data 8a is output.

The data 8a and the data effective signal 8a' are input to the selector switch unit 4 and distributed to the selector sections 42a to 42n by the distributor 42.

As described above, since the data 8a has already been selected by the selector section 42n, the data 8a and the data effective signal 8a' output from the input accommodation unit 1a are transferred to the output accommodation unit 2n as the data 9n and the data effective signal 9n'.

In response to this, the data receiving section 21 of the output accommodation unit 2n sequentially receive data 9n with reference to the data effective signal 9n' and stores it in the corresponding memory 22.

At the end of output of the data 8a, the input accommodation unit 1a stops outputting the transfer request 5an which has been continuously output during the output of the data (inactive="H" level).

After the switch controller 3 outputs the transfer permission 6an, it monitors the corresponding transfer request 5an. Upon detection of the stop of the transfer request 5an, the switch controller 3 determines the end of data output from the input accommodation unit 1a and stops outputting the transfer permission 6an.

Any one of the transfer permissions 6an to 6nn is not output, the selector control signal 7n is initialized, and the selector section 42n of the selector switch unit 4 is set in a non-selection state (initial state).

At time $T_2$, the switch controller 3 starts monitoring the next transfer request.

If no transfer permission is output in response to the output transfer request, the input controller 13 of each of the input accommodation units 1a to 1n continuously outputs the corresponding transfer request.

The transfer request 5bn from the input accommodation unit 1b which has not been selected at time $T_1$ is output at time $T_2$. The transfer request 5bn is detected by the switch controller 3.

When the transfer request 5bn is selected by the switch controller 3, the transfer permission 6bn is selected in the same manner as described above. The selector control signal 7n is output from the signal generator 32n, and the data 8b is connected as the data 9n. The input accommodation unit 1b starts outputting the data 8b.

The selecting sections 31a to 31n for monitoring the transfer requests having the output transfer units as transfer destinations and the signal generators 32a to 32n for outputting the selector control signals 7a to 7n on the basis of the transfer permissions output from the selecting sections are arranged as transfer control means in the switch controller 3 in correspondence with the output accommodation units 2a to 2n.

The selector sections 42a to 42n are arranged as actual data transfer media in the selector switch unit 4 in correspondence with the output accommodation units 2a to 2n to select corresponding data from the input accommodation units 1a to 1n to the output accommodation units on the basis of the selector control signals 7a to 7n.

The selecting sections are arranged in the output accommodation units 2a to 2n to determine whether transfer is possible, on the basis of the transfer requests from the input accommodation units 1a to 1n and the states of the output accommodation units 2a to 2n which correspond to the transfer requests. The transfer control means is separated from the actual data transfer media. Only one transfer request is selected for each output accommodation unit. Therefore, a data loss in the switch can be suppressed.

The selector sections 42a to 42n are controlled on the basis of the selector control signals 7a to 7n generated on the basis of the transfer permissions, and the output accommodation units 2a to 2n can be connected to the input accommodation units 1a to 1n in a one-to-one correspondence through the corresponding selector sections 42a to 42n. For this reason, the media need not be shared, and the output and input transfer rates of each input accommodation units and each output accommodation unit can be increased up to the medium transfer rate (electrical transfer rate of the physical medium).

The second embodiment of the present invention will be described with reference to FIG. 5.

FIG. 5 shows a data transfer switch according to the second embodiment of the present invention. The same reference numerals as in the previous explanation (see FIG. 1) denote the same parts in FIG. 5.

Referring to FIG. 5, reference numeral 5' denotes a transfer request bus for time-divisionally multiplexing various transfer requests and transferring the multiplexed request; 6', a transfer permission bus for time-divisionally multiplexing various transfer permissions and transferring the multiplexed transfer permission; and 15 denotes a control bus for outputting frame and clock signals as control signals for the transfer request bus 5' and the transfer permission bus 6'.

Reference numerals 1a' to 1n' denote input accommodation units having input controllers 13' for transmitting and receiving transfer requests and transfer permissions through the transfer request bus 5' and the transfer permission bus 6'; 2a' to 2n', output accommodation units having selecting sections 23 each for monitoring the transfer request output onto the transfer request bus 5' to the home accommodation unit as the transfer destination, and at the same time outputting a predetermined transfer permission onto the transfer permission bus 6' upon detection of the corresponding transfer request. Reference numeral 3' denotes a switch controller for monitoring various transfer permissions output onto the transfer permission bus 6' and outputting a corresponding selector control signal 7; and 10, a timing generator for outputting frame and clock signals to the control bus 15.

In the first embodiment (see FIG. 1), when the transfer request 5 and the transfer permission 6 are to be transmitted/received between each of the input accommodation units 1a to 1n and the switch controller 3, the independent signal lines are used. However, in the second embodiment, the transfer request bus 5' and the transfer permission bus 6' are arranged to time-divisionally transfer the transfer request and the transfer permission.

Figure 6:
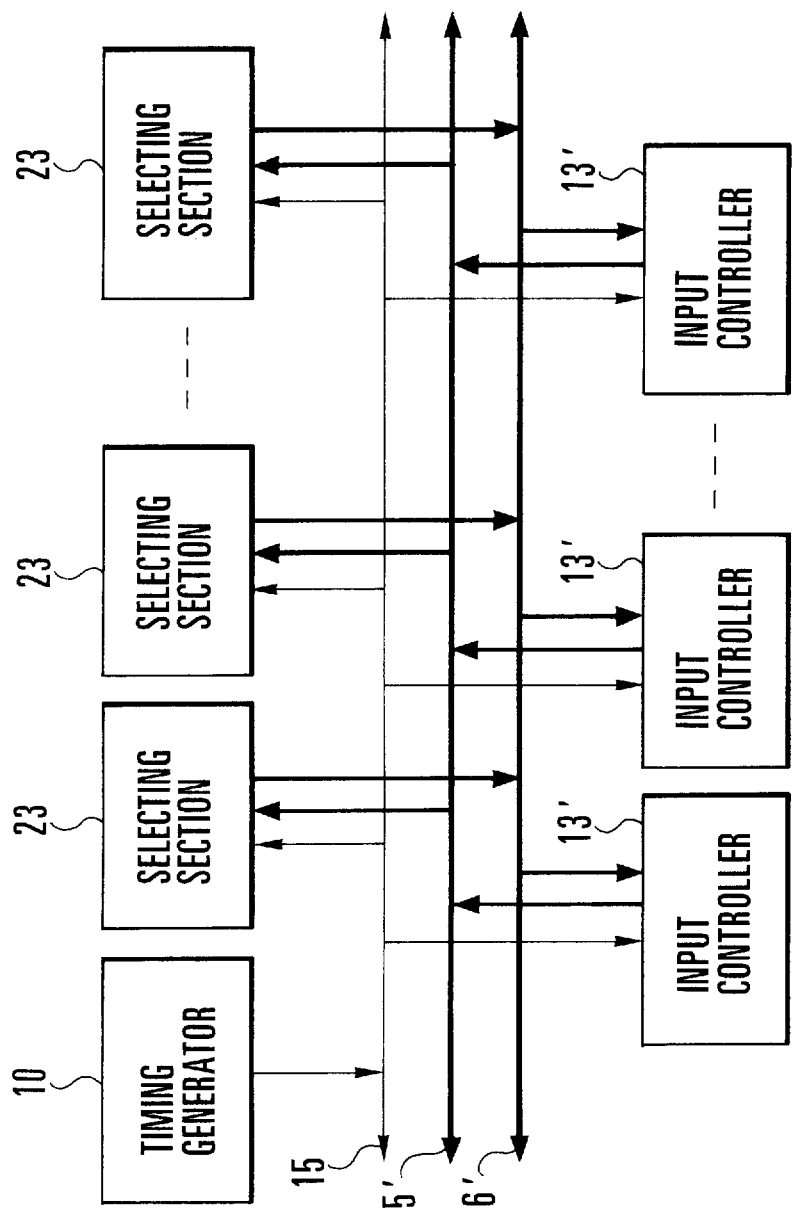
FIG. 6 is a block diagram showing a peripheral arrangement of a transfer request bus and a transfer permission bus.

In practice, as shown in FIG. 6, the input controllers 13' of the input accommodation units 1a' to 1n' are connected to the transfer request bus 5' and the transfer permission bus 6'. At the same time, the selecting sections 23 of the output accommodation units 2a' to 2n' are connected to the transfer request bus 5' and the transfer permission bus 6'. The frame and clock signals are supplied from the timing generator 10 to the input controllers 13' and the selecting sections 23 through the control bus 15.

Figure 7:
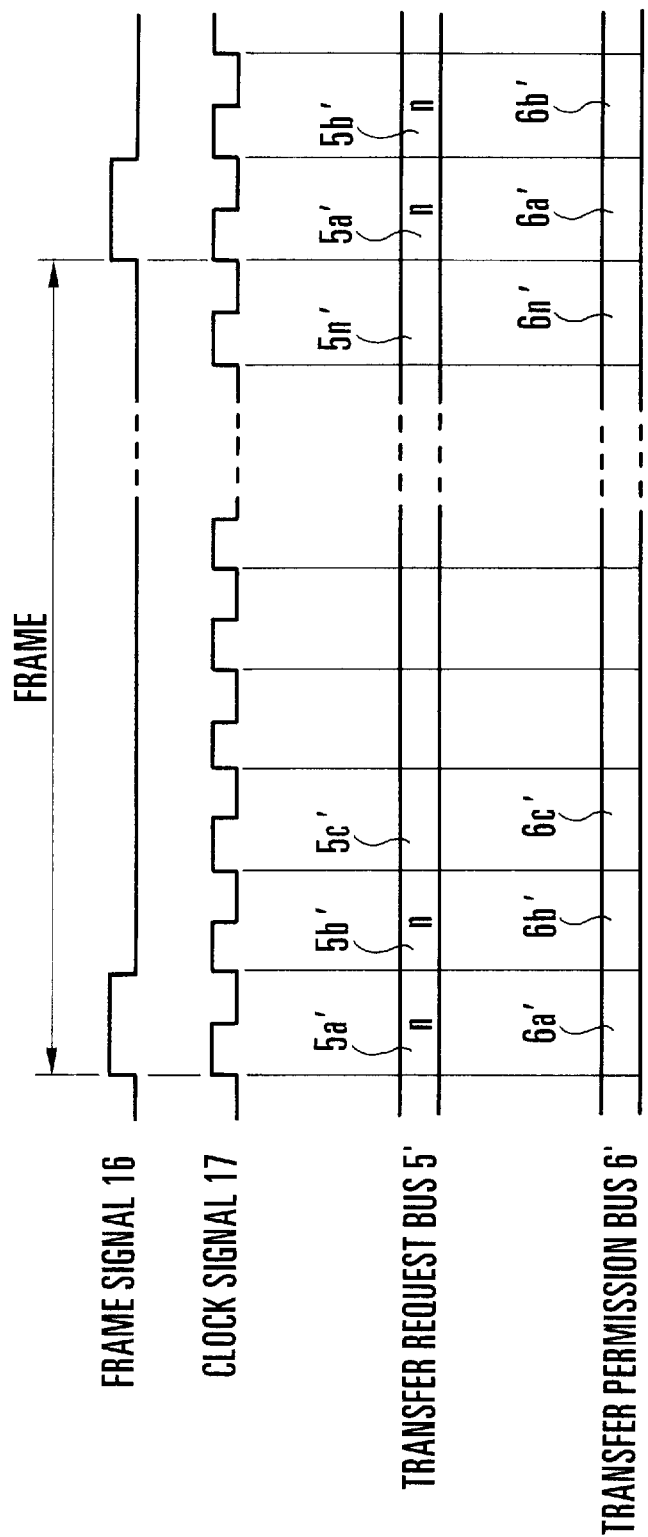
FIG. 7 is a timing chart showing a transmission/reception operation of a transfer request and a transfer permission.

FIG. 7 shows the transmission/reception operations of the transfer request and the transfer permission through the transfer request bus and the transfer permission bus.

Slots 5a' to 5n' and 6a' to 6n' corresponding to the input accommodation units 1a' to 1n' are time-divisionally assigned on the transfer request bus 5' and the transfer permission bus 6' on the basis of a clock signal 17. These slots are repeated on the basis of a frame signal 16.

Transfer requests are transmitted such that pieces of information representing the output accommodation units 2a' to 2n' as the transfer destinations are stored in the slots 5a' to 5n' on the transfer request bus 5' which correspond to the input accommodation units 1a' to 1n' serving as the request sources.

Transfer permissions are transmitted such that pieces of information representing the output accommodation units 2a' to 2n' serving as the transfer designations are stored in the slots 6a' to 6n' on the transfer permission bus 6' which correspond to the input accommodation units 1a' to 1n' serving as the request sources.

Figure 8:
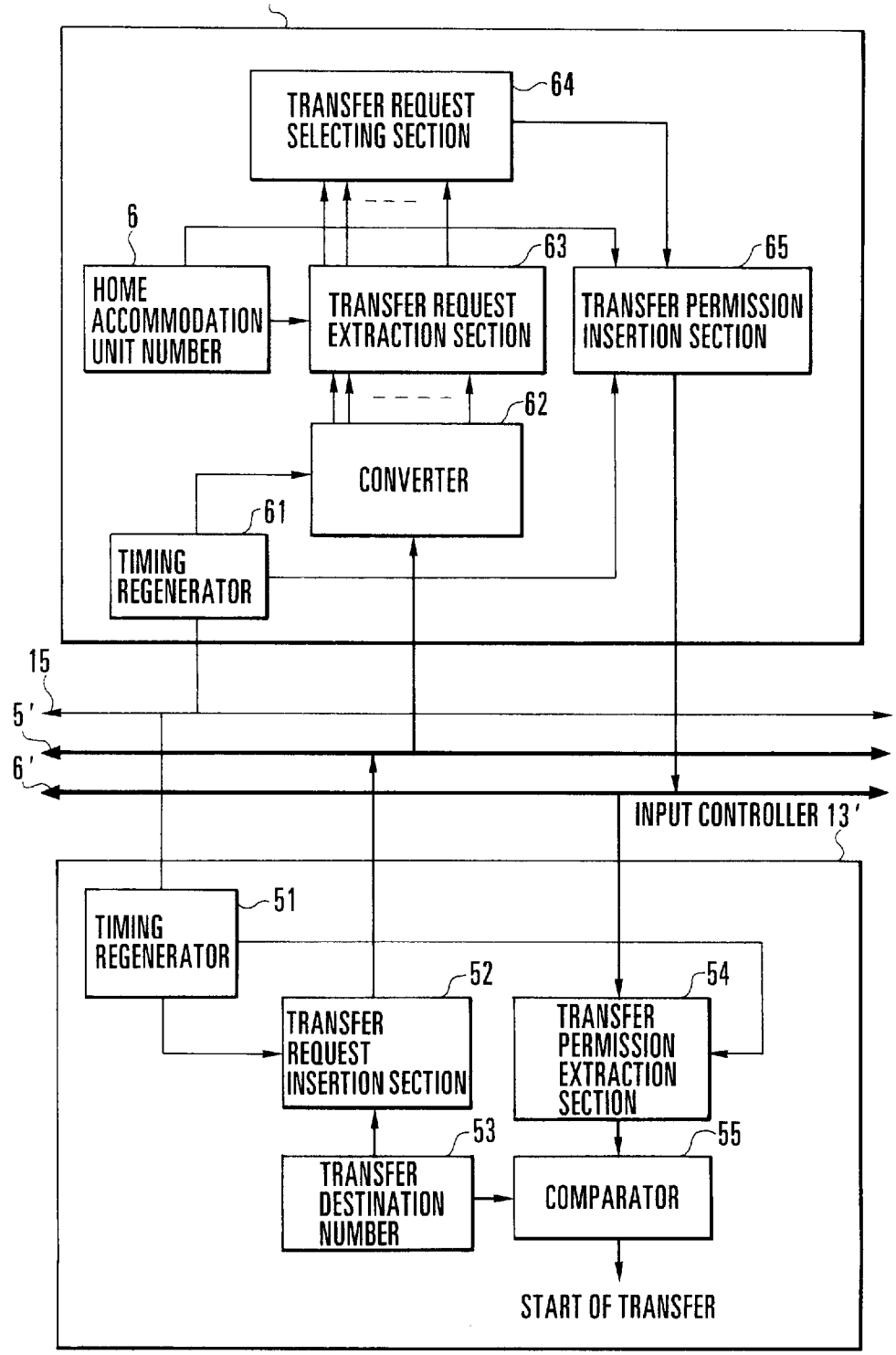
FIG. 8 is a block diagram of an input controller and a selecting section.

A data transfer operation from the input accommodation units 1a' and 1b' to the output accommodation unit 2n' will be described with reference to FIG. 8. FIG. 8 shows the input controller 13' and the selecting section 23.

When external data for the output accommodation unit 2n' is written in a memory (see FIG. 5) of the input accommodation unit 1a', the input controller 13' acquires a transfer destination number 53, i.e., "n" in this case, representing the output accommodation units 2a' to 2n' serving as the transfer destinations of data through a corresponding data transfer section 12.

A transfer request insertion section 52 inserts this transfer destination number "n" in the slot 5a' assigned for the home accommodation unit on the transfer request bus 5', thereby outputting a transfer request (see FIG. 7).

When data for the output accommodation unit 2n' is written in a memory 11 of the input accommodation unit 1b', a transfer destination number "n" is inserted into the slot 5b' on the transfer request bus 5', thereby outputting a transfer request in the same manner as described above.

The transfer request inserted in each slot as described above is converted into parallel data by a converter 62 in the selecting section 23 of the output accommodation unit 2n' and output as a transfer destination number.

Subsequently, of all the transfer destination numbers from the converter 62, a home accommodation unit number 66, i.e., a number corresponding to "n" is extracted as a home transfer request by a transfer request extraction section 63.

In this case, the transfer numbers "n" representing the transfer requests for the home accommodation unit are inserted in the slots 5a' and 5b', and a transfer request selecting section 64 selects one of these transfer requests, e.g., the transfer request in the slot 5a' corresponding to the input accommodation unit 1a'.

In response to this, a home accommodation unit number 66 "n" is inserted in a slot of the succeeding frame, i.e., slot 6a' corresponding to the input accommodation unit 1a' on the transfer permission bus 6' which corresponds to the selected transfer request source, i.e., the transfer source. Therefore, a transfer permission is output.

The input controller 13' of the input accommodation unit 1a' causes a transfer permission extraction section 54 to extracts the transfer destination number from the home slot 6a' of the transfer permission bus 6'. A comparator 55 compares the extracted transfer destination number with the transfer destination number 53 obtained at the time of transfer request. If a coincidence is established, reception of the transfer permission is detected.

If "n" is extracted from the slot 6a', this coincides with the transfer destination number 53 obtained at the time of transfer request. Therefore, a data transfer start instruction is output to the data transfer section 12.

On the other hand, the switch controller 3' always monitors the slots 6a' to 6n' on the transfer permission bus 6' and extracts one of the transfer destination numbers inserted in the slots 6a' to 6n'. The switch controller 3' uses the extracted transfer destination number as the transfer permission for a corresponding one of the input commodation units 1a' to 1n' and detects the transfer source from the time position of the selected one of the slots 6a' to 6n' and the transfer destination from the extracted transfer destination number.

In accordance with the above detection, one of the selector control signals 7a to 7n for designating selective connection with the transfer source is output to any one of selector sections 42a to 42n in the selector switch unit 4 which corresponds to the extracted transfer destination number. In the same manner as in the first embodiment, data 8a output from the data transfer section 12 of the input accommodation unit 1a' serving as the transfer source is transferred as data 9n to the output accommodation unit 2n' serving as the transfer destination through the selector section 42n.

Even during data transfer, the input controller 13' of the input accommodation unit 1a' continuous inserts the transfer request in the home slot 5a', as described above. Insertion of the transfer request is stopped at the end of data transfer.

By the stop of the transfer permission, the selecting section 23 of the output accommodation unit 2n' detects the end of data transfer. Detection for a new transfer request is then started.

As in the transfer request from the input accommodation unit 1b', if the transfer request is not accepted, the transfer request is continuously output until the corresponding transfer permission is received.

In response to the start of detection of a new transfer request by the selecting section 23 of the output accommodation unit 2n', the transfer request from the input accommodation unit 1b' can be accepted.

Timing regenerators 51 and 61 arranged in each input controller 13' and each selecting section 23 always regenerate and supply predetermined timing signals on the basis of a frame signal 16 and a clock signal 17 from a control bus 15.

Each section detects the time positions of the slots on the transfer request bus 5' and the transfer permission bus 6' on the basis of these timing signals.

If no data to be transferred is present in the input controller 13', predetermined information representing invalidity of a transfer request is inserted in the home slot on the transfer request bus 5' and detected by the corresponding selecting section 23.

In the selecting section 23, pieces of predetermined information representing inhibition of transfer are inserted in the slots 6a' to 6n' on the transfer permission bus 6' for the input accommodation units 1a' to 1n' which serve as transfer sources having no transfer requests and transfer sources to which transfer permissions are not sent back. This is detected by the corresponding input controllers 13'.

In the above description, the selecting sections 23 are arranged for the corresponding output accommodation units 2a' to 2n'. However, selecting sections may be arranged separately from the output accommodation units 2a' to 2n'.

The switch controller 3' monitors the slots 6a' to 6n' on the transfer permission bus 6' to generate the selector control signal 7. However, the selector control signals 7 may be generated on the basis of transfer permissions individually notified from the transfer request selecting sections 64 of the selecting sections 23.

As described above, the transfer request bus 5' and the transfer permission bus 6' are arranged, and a plurality of slots are formed on each bus. The transfer requests and transfer permissions are time-divisionally multiplexed, and the multiplexed transfer request and the multiplexed transfer permission are transferred. Therefore, the number of input and output signal lines with respect to the input accommodation units 1a' to 1n' can be reduced to suppress an increase in hardware.

The selecting sections 23 are arranged in the corresponding output accommodation units 2a' to 2n'. A predicted maximum number of selecting sections 23 need not be prepared, and hardware can be reduced to a scale corresponding to the actual number of accommodation units.

Slots are formed for the input accommodation units 1a' to 1n' serving as the request sources, and transfer destination numbers representing the output accommodation units 2a' to 2n' serving as the transfer destinations are inserted in these slots, thereby notifying and detecting the transfer source and the transfer destination. In practice, only the transfer destination numbers are exchanged through the buses, and the information volume can be reduced. Therefore, high-speed transfer control can be performed, and the data transfer switch can sufficiently cope with an increase in the number of accommodation units.

In each signal generator, the selector control signal is generated on the basis of the transfer destination number inserted in each slot on the transfer permission bus for the input accommodation unit serving as the transfer source. Therefore, the signal generator can be shared, and the signal generator need not be arranged for each selecting section. An increase in hardware can be suppressed.

The third embodiment of the present invention will be described with reference to FIG. 9.

Figure 9:
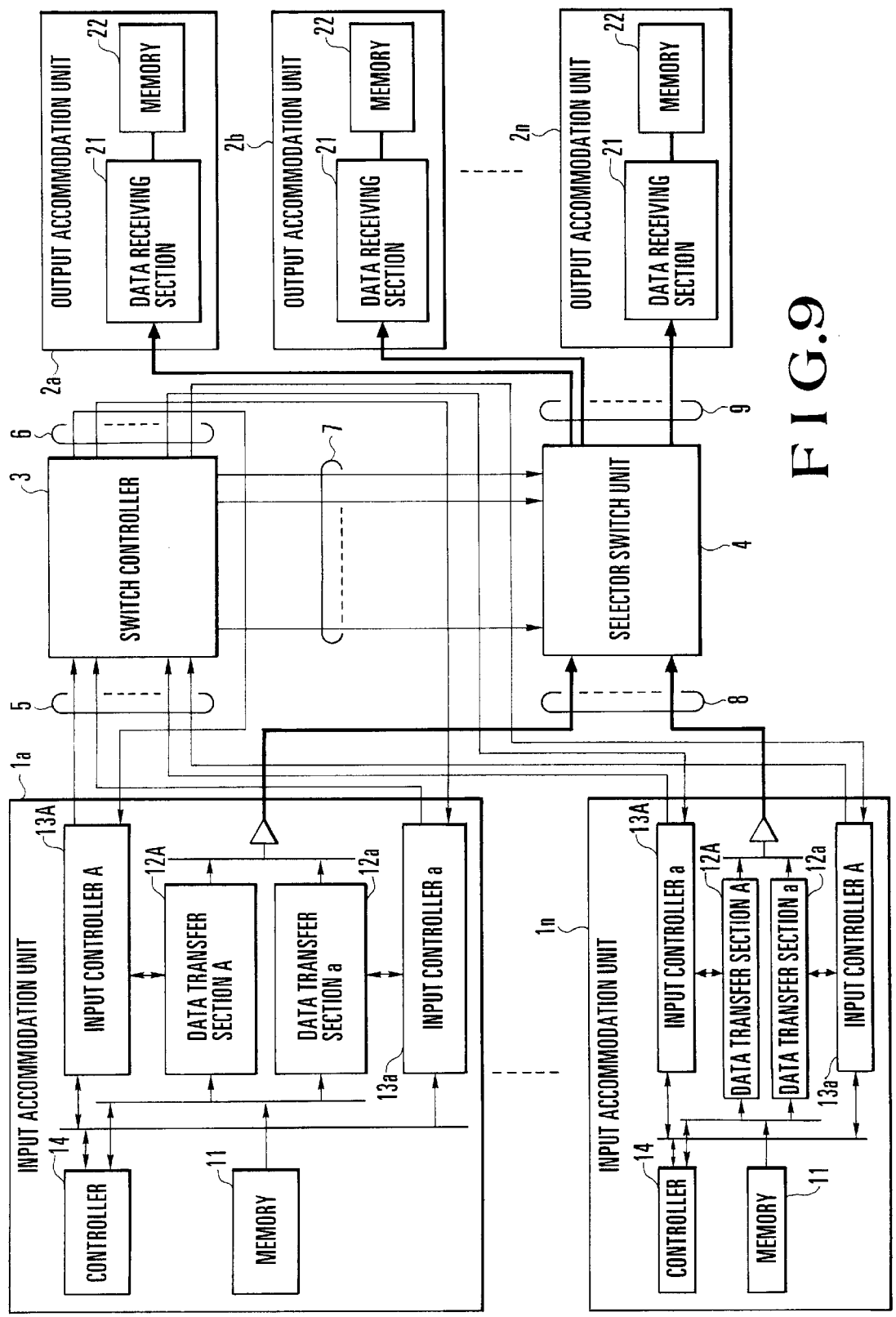
FIG. 9 is a block diagram of a data transfer switch according to the third embodiment of the present invention.

FIG. 9 shows a data transfer switch according to the third embodiment of the present invention. The same reference numerals as in the previous explanation (FIG. 1) denote the same parts in FIG. 9.

In each of input accommodation units 1a to 1n of FIG. 9, reference numeral 11 denotes a memory for temporarily storing external input data; 12A and 12a, data transfer sections for outputting the data in the memory 11 as readout data 8 to a selector switch unit 4; 13A and 13a, input controllers for outputting transfer requests 5 for requesting data transfer to a switch controller 3 on the basis of the data in the data transfer sections 12A and 12a and designating the start of data transfer to the data transfer sections 12A and 12a in response to transfer permissions 6; and 14, a controller for managing the data in the memory 11.

Figure 10:
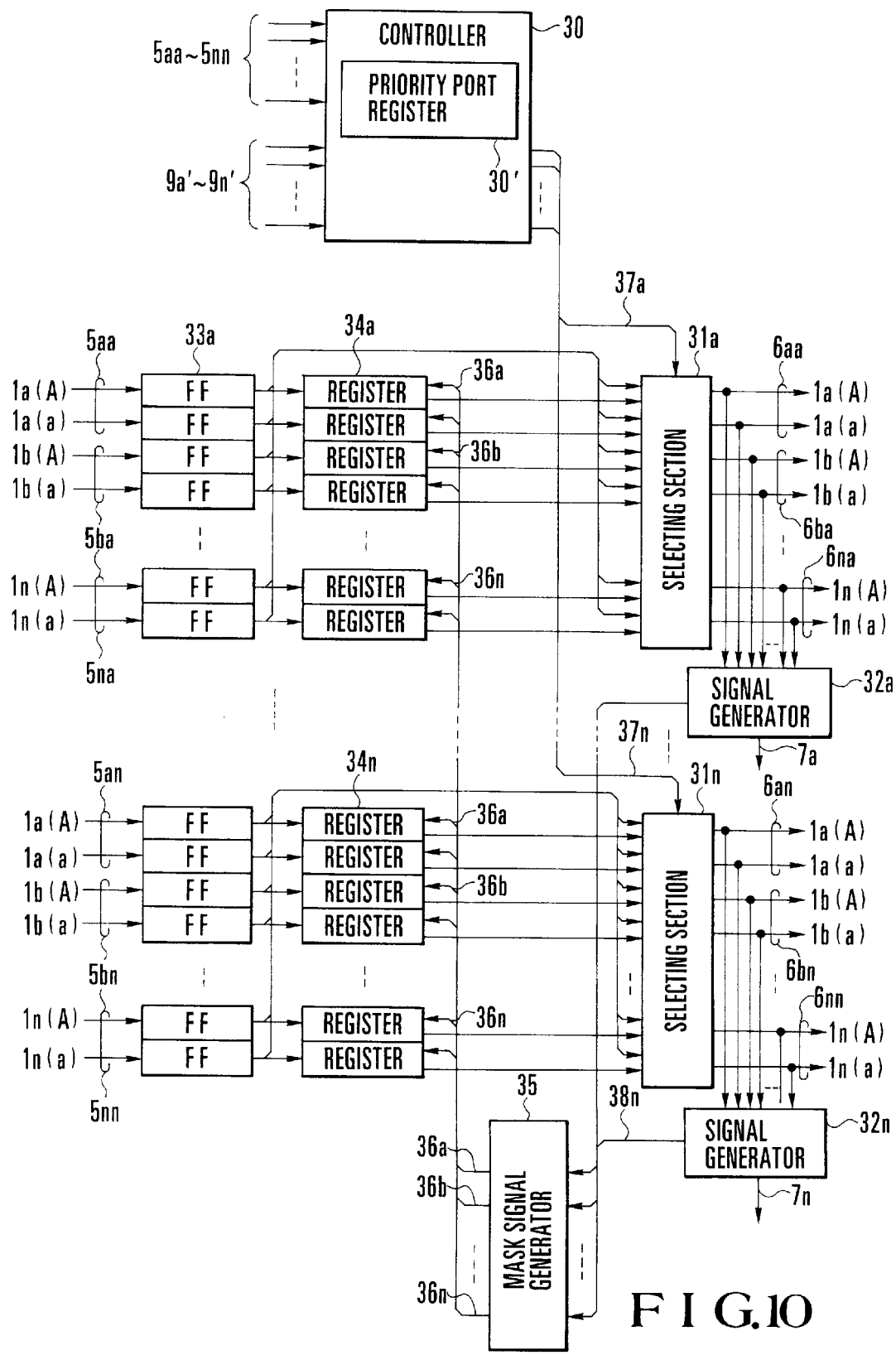
FIG. 10 is a block diagram showing a switch controller.

FIG. 10 shows the arrangement of the switch controller. Referring to FIG. 10, reference numeral 35 denotes a mask signal generator for generating predetermined mask signals 36a to 36n corresponding to the input accommodation units 1a to 1n on the basis of pieces of information 38a to 38n containing transfer sources from the signal generators 32a to 32n; 33a to 33n, flip-flops (to be referred to as FFs hereinafter) for individually holding transfer requests from the input controllers 13A and 13a of the respective input accommodation units 1a to 1n; and 34a to 34n, mask registers (to be referred to as registers hereinafter) for masking the transfer requests from the FFs 33a to 33n on the basis of the mask signals 36a to 36n. Outputs from the FFs 33a to 33n and the registers 34a to 34n are input to corresponding selecting sections 31a to 31n.

Reference numeral 30 denotes a controller for always monitoring the transfer requests from the input controllers 13A and 13a of the respective input accommodation units 1a to 1n, outputting selecting section enable signals 37a to 37n on the basis of the contents of a priority port register 30' when any one of the transfer requests is detected, thereby designating transfer request arbitration processing in an order of the predetermined selecting sections 31a to 31n. At the same time, the controller 30 detects on the basis of data effective signals 9a' to 9n' (to be described later) whether data transfer is being performed.

For example, the selecting section 31a corresponds to the output accommodation unit 2a in FIG. 10. Transfer requests 5aa to 5na having the output accommodation unit 2a as the data transfer destination are input from the input controllers 13A and 13a of the input accommodation units 1a to 1n to the selecting section 31 through the FF 33a and the register 34a.

The selecting section 31a uniquely manages each of the transfer requests 5aa to 5an having the output accommodation unit 2a as the data transfer destination and selects one of the transfer requests 5aa to 5na. The selecting section 31a outputs a corresponding one of transfer permissions 6aa to 6na to a corresponding one of the input accommodation units 1a to 1n serving as the transfer sources which has output the selected one of the transfer requests 5aa to 5na.

The signal generator 32a receives each of the transfer permissions 6aa to 6na output from the selecting section 31a and codes these transfer permissions 6aa to 6na to output a selector control signal 7a to the selector switch unit 4.

As described above, the switch controller 3 has identical arrangements for the output accommodation units 2a to 2n. Note that the transfer request 5an and the transfer permission 6an are output from the input accommodation unit 1a having the output accommodation unit 2n as the data transfer destination. Individual operations are performed in correspondence with the data transfer sections 12A and 12a.

Transfer request arbitration processing operations in the selecting sections 31a to 31n are controlled on the basis of selecting section enable signals 37a to 37n from the controller 30. In particular, the controller 30 monitors all the transfer requests. When any one of the transfer requests is detected, arbitration processing is executed in a predetermined order from the selecting sections 31a to 31n represented by the priority port register 30'.

The registers 34a to 34n receive the mask signals 36a to 36n generated by the mask signal generator 35 on the basis of the pieces of transfer information 38a to 38n. When a transfer request from an arbitrary one of the input accommodation units 1a to 1n is selected in one of the selecting sections 31a to 31n, the transfer request from the corresponding one of the input accommodation units 1a to 1n which serves as the transfer source is masked. Therefore, multiple selection by other selecting sections for the transfer requests from one of the input accommodation units 1a to 1n can be prevented.

The operation of the data transfer switch according to the third embodiment of the present invention will be described with reference to FIG. 11.

Figure 11:
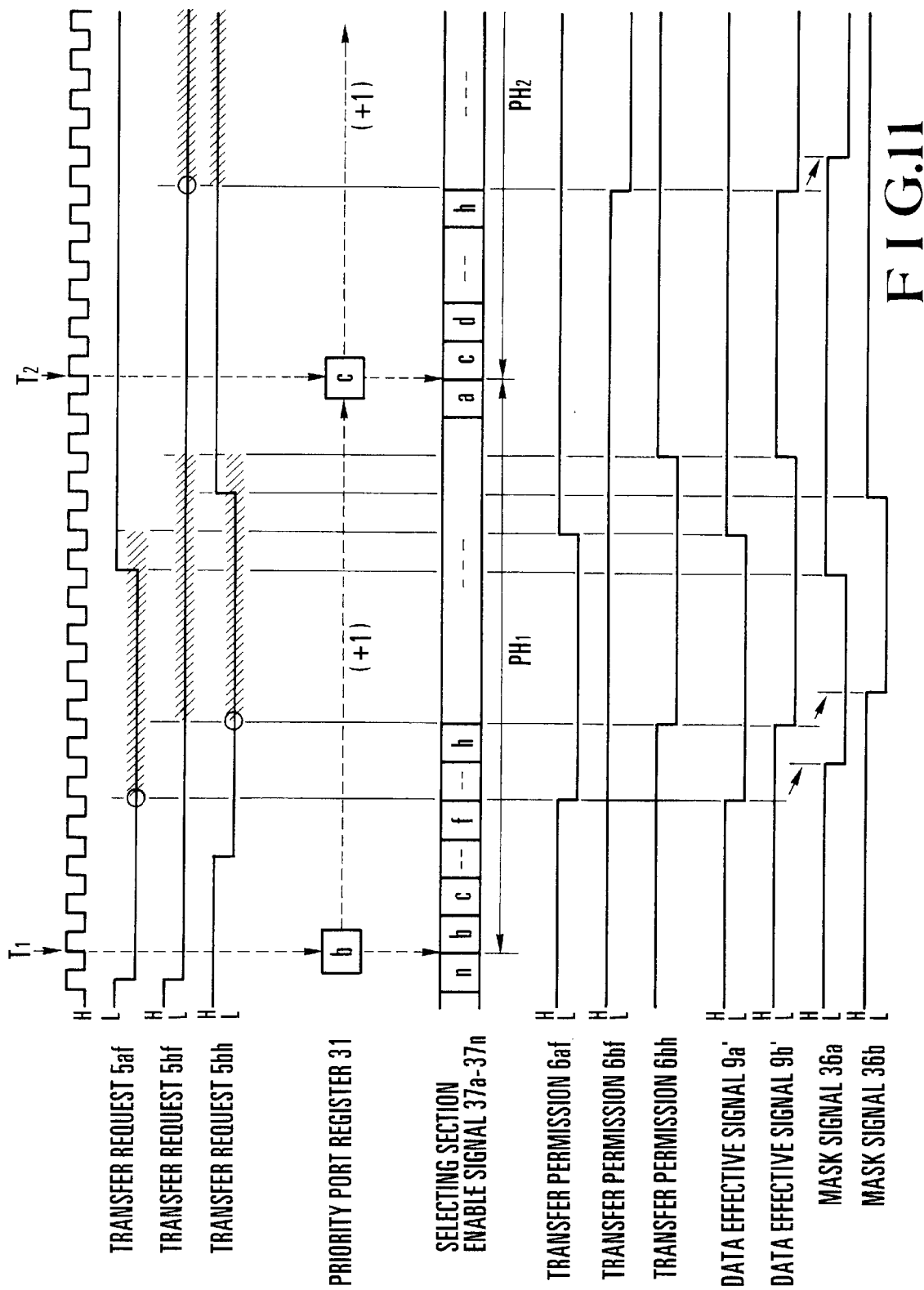
FIG. 11 is a timing chart showing the operation of the data transfer switch in FIG. 9.
Figure 13:
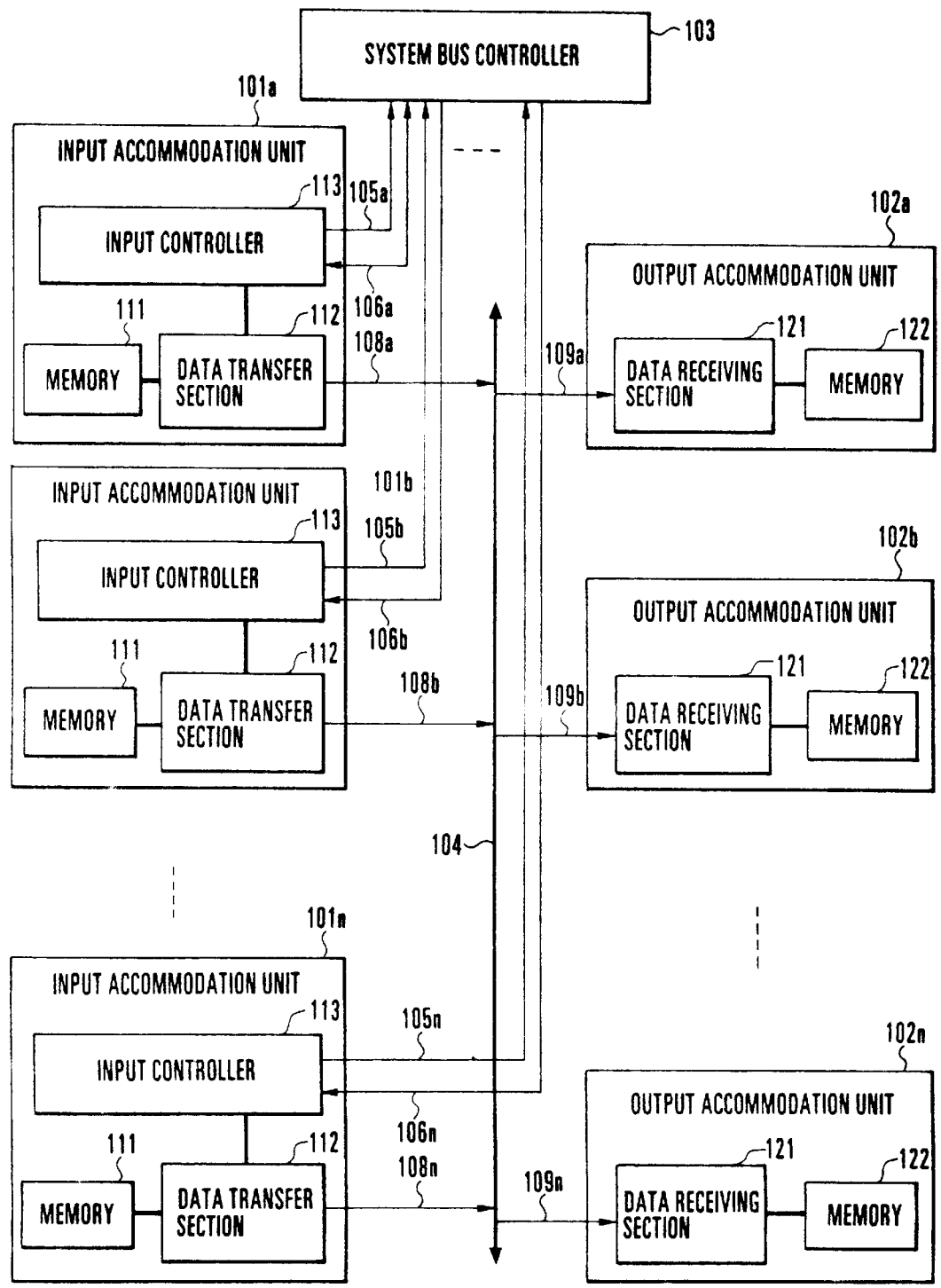
FIG. 13 is a block diagram showing a conventional data transfer switch.

FIG. 11 shows the operation of the data transfer switch. The same reference numerals as in the previous explanation (FIGS. 9 and 10) denote the same signals.

Referring to FIG. 11, reference numerals 9a' and 9b' denote data effective signals representing the effective periods of data 9a and 9b output from the selector switch unit 4 to the output accommodation units 2a and 2b. The data effective signals 9a' and 9b' are output as in the data 8 from the input accommodation units 1a to 1n serving as the transfer sources and are transferred and output through the selector switch unit 4.

A controller 14 (see FIG. 9) manages external data write access to the memory 11 in each of the input accommodation units 1a to 1n.

Each of data 71a to 71k written in the memory 11 is constituted by a header 72 representing each transfer destination, a pointer 74 representing a transfer order, and actual transfer data 73. The start position information of each of the data 71a to 71k is stored in the immediately preceding pointer 74. This data structure is managed as a data string based on an input order.

Pieces of transfer destination information corresponding to the data stored in the data transfer sections 12A and 12a are stored in the input controllers 13A and 13a, respectively.

To stored the data of the memory 11 in one of the data transfer sections 12A and 12a, the pieces of transfer destination information held in the input controllers 13A and 13a are checked to conform the free areas of the data transfer sections 12A and 12a.

If the free area of at least one of the data transfer sections 12A and 12a is confirmed, data are sequentially stored from the data 71a represented by the transfer data pointer 70 in the controller 14.

The header 72 of the data 71a is confirmed from the memory 11 and compared with the pieces of transfer destination information held in the input controllers 13A and 13a.

If the transfer destination represented by the header 72 does not coincide with any one of the pieces of transfer destination information, the data 73 of the data 71a is stored in the confirmed free area of the data transfer section 12A or 12a, and the data 71a is deleted from the data string. At the same time, the transfer destination represented by the header 72 is held in the corresponding input controller 13A or 13a. A predetermined transfer request 5 is output to the switch controller 3.

If the transfer destination represented by the header 72 coincides with any one of the pieces of transfer destination information, next data 71b represented by the pointer 74 of the data 71a is stored in the same manner as described above.

In this manner, data storage is performed in a data string order in the memory 11. When the data are stored in all the data transfer sections 12A and 12a, storage processing ends to set a standby state.

Assume that data is output from any one of the data transfer sections 12A and 12a, that the transfer destination information held in the input controller 13A or 13a is cleared, and that a free state is confirmed. In this case, data are stored from the data represented by the transfer data pointer 70.

Note that the contents of the transfer data pointer 70 are position information representing the start data of the data string. Only if the start data is deleted from the data string, the contents are updated to a value representing the subsequent data.

To store the data 71a to 71k of the memory 11 in the data transfer sections 12A and 12a, the transfer destinations are compared with each other, and data having the same transfer destination are not simultaneously stored in each of the data transfer sections 12A and 12a. Therefore, even if the plurality of data transfer sections 12A and 12a are arranged in each of the input accommodation units 1a to 1n and a plurality of transfer requests are separately output, the transfer order of the data having the same transfer destination can be maintained.

As described above, the data are stored in the data transfer sections 12A and 12a, and the individual transfer requests 5 are output from the input controllers 13A and 13a to the switch controller 3 on the basis of the transfer destinations represented by the data stored in the data transfer sections 12A and 12a.

For example, if a data transfer destination stored in the data transfer section 12A of the input accommodation unit 1a is the output accommodation unit 2f, the transfer request 5*af* (active="L" level) having the output accommodation unit 2*f* as the transfer destination is output from the input controller 13A.

On the other hand, when the transfer request 5*bf* (active="L" level) having the output accommodation unit 2*f* as the transfer destination is output from the input controller 13A of the input accommodation unit 1*b*, the transfer requests 5*af* and 5*bf* output from the input accommodation units 1*a* and 1*b* are detected at time $T_1$ by the controller 30 in the switch controller 3. An arbitration phase $PH_1$ for the transfer requests is started on the basis of the selecting section enable signals 37*a* to 37*n* from the controller 30.

The selecting section enable signal 37*b* is output to the selecting section 31*b* on the basis of a value, i.e., "b" in this case, represented by the priority port register 30'.

In response to this, the selecting section 31*b* detects outputs from the register 34*b* and selects any output if it indicates a transfer request. The selecting section 31*b* outputs a transfer permission for permitting the transfer request to the transfer source.

The selecting section enable signal 37*c* is output to the subsequent selecting section 31*c* in a predetermined order, i.e., in an order of a, b, c, . . . , and the transfer request is selected by the controller 30 in the same manner as described above. Note that the selecting section enable signals 37*a* to 37*n* are not output to the selecting sections during data transfer with reference to the data effective signals 9*a'* to 9*n'*.

As described above, the selecting sections 31*a* to 31*n* are selected in accordance with the selecting section enable signals 37*a* to 37*n*. For example, if the selecting section 31*f* is selected, the transfer requests 5*af* and the 5*bf* are detected.

If the transfer request 5*af* serving as a transfer request for the output accommodation unit 2*b* is selected, the transfer permission 5*af* (active="L" level) is output from the selecting section 31*f* to the input controller 13A of the input accommodation unit 1*a* serving as the transfer source. In this case, other transfer requests 6*bf* to 6*nf* are not output (inactive="H" level).

These transfer permissions 6*af* to 6*nf* are also input to the signal generator 32*f*. The output states of the transfer permissions 6*af* to 6*nf* are coded and output as the selector control signal 7*f* to the corresponding selector section 42*f* of the selector switch unit 4 (see FIG. 3).

The transfer source information 38*f* is input from the signal generator 32 to the mask signal generator 35. The mask signal generator 35 outputs the mask signal 36*a* (active="L" level) corresponding to the input accommodation unit 1*a* serving as the transfer source.

In response to this, of the transfer requests 5*aa* to 5*an* from the registers 34*a* to 34*n*, the transfer requests from the input accommodation unit 1*a* are masked (see hatched portions in FIG. 11). The transfer request output from the same input accommodation unit 1*a* is stopped until the mask is released.

In response to the selector control signal 7*f*, the selector section 42*f* controls the internal switches to select any one of the data 8*a* to 8*n* output from a distributor 41 as data 9 output to the output accommodation unit 2*f*, thereby connecting the corresponding input and output accommodation units.

As described when the transfer permission 6*af* is output, the data 8*a* from the input accommodation unit 1*a* is selected on the basis of this selector control signal 7*f*.

On the other hand, the input controller 13A of the input accommodation unit 1*a* which has detected the transfer permission 6*af* outputs a transfer start instruction to the data transfer section 12A. In response to this, the data 8*a* is output from the data transfer section 12A. At the same time, the data transfer section 12A outputs a data effective signal 8*a'* (not shown) representing the effective period of the data 8*a*.

The data 8*a* and the data effective signal 8*a'* are input to the selector switch unit 4 and distributed to selector sections 42*a* to 42*n* by the distributor 42.

Since the data 8*a* has already been selected by the selector section 42*f*, the data 8*a* and the data effective signal 8*a'* output from the input accommodation unit 1*a* are transferred to the output accommodation unit 2*f* as data 9*f* and a data effective signal 9*f'*.

In response to this, a data receiving section 21 of the output accommodation unit 2*f* sequentially receives the data 9*f* with reference to the data effective signal 9*f'* and stores the data 9*f* in a memory 22.

The selecting section enable signal 37*h* is then output from the controller 30, and transfer request selection is performed in the same manner as described above.

As shown in FIG. 11, if the transfer request 5*bh* for the output accommodation unit 2*h* is output from the other input controller 13*a* of the input accommodation unit 1*b* upon generation of the transfer request 5*bf*, the transfer request 5*bh* is selected by the selecting section 31*h*, so that the transfer permission 6*bh* (active="L" level) is output.

The selector control signal 7*h* is output from the signal generator 32*h* on the basis of this transfer request 6*bh* and is output from the selector section 42*h* as the data 9 for the output accommodation unit 2*h*, so that the data 8*b* output from the distributor 41 is selected. Therefore, the corresponding input and output accommodation units are connected.

The data 8*b* and the data effective signal 8*b'* output from the data transfer section 12*a* of the input accommodation unit 1*b* on the basis of the transfer permission 6*bh* are transferred to the output accommodation unit 2*h* as data 9*h* and a data effective signal 9*h'*.

At the end of data transfer, the input accommodation unit 1*a* stops generating the data effective signal 8*a'* (inactive="H" level) and the transfer request 5*af* (inactive="H" level).

In response to this, the data effective signal 9*a'* is disabled (inactive="H" level), and the transfer request 5*af* directly input from the FF 33*f* to the selecting section 31*f* is also disabled. The transfer permission 6*af* from the selecting section 31*f* is also disabled, and the mask signal 36*a* is also disabled (inactive="H" level).

At the end of data transfer, the input accommodation unit 1*b* also disables the data effective signal 8*b'* and the transfer request 5*bh*. In response to this the data effective signal 9*b'* is disabled, and the transfer request directly input from the FF 33*h* to the selecting section 31*h* is also disabled. The transfer permission 6*bh* from the selecting section 31*h* is disabled, and the mask signal 36*b* is also disabled.

Masking for the transfer request 5*bf* output from the input accommodation unit 1*b* is released, and the transfer request 5*bf* is output from the register 34*f* to the selecting section 31*f*.

When the enable signals are completely output to all the selecting sections 31*a* to 31*n*, and the arbitrary phase $PH_1$ is completed, the transfer request standby state is set by the controller 30 in the same manner as described above.

Since the transfer request 5*bf* is output, a new arbitration phase $PH_2$ is started succeeding the arbitrary phase $PH_1$.

In this case, since "b" is set in the priority port register 30 in the previous arbitration phase $PH_1$, "c" is set succeeding "b" in an order of a, b, c, . . . in correspondence with the next arbitration phase $PH_2$. The selecting section enable signal 37c is output from the selecting section 31c.

The transfer request 5bf is selected by the arbitration processing of the selecting section 31f, and the transfer permission 6bf is output in the same manner as described above. Therefore, data transfer is started.

In this manner, the selecting sections 31a to 31n for monitoring the transfer requests having the output accommodation units serving as the transfer destinations and the signal generators 32a to 32n for outputting the selector control signals 7a to 7n on the basis of the transfer permissions output from the selecting sections are arranged as the transfer control means in the switch controller 3 in correspondence with the output accommodation units 2a to 2n.

The selector sections 42a to 42n are arranged as actual data transfer media in the selector switch unit 4 in correspondence with the output accommodation units 2a to 2n to select corresponding data from the input accommodation units 1a to 1n to the output accommodation units on the basis of the selector control signals 7a to 7n.

The selecting sections are arranged in the output accommodation units 2a to 2n to determine whether transfer is possible, on the basis of the transfer requests from the input accommodation units 1a to 1n and the states of the output accommodation units 2a to 2n which correspond to the transfer requests. The transfer control means is separated from the actual data transfer media. Only one transfer request is selected for each output accommodation unit. Therefore, a data loss in the switch can be suppressed.

The selector sections 42a to 42n are controlled on the basis of the selector control signals 7a to 7n generated on the basis of the transfer permissions, and the output accommodation units 2a to 2n can be connected to the input accommodation units 1a to 1n in a one-to-one correspondence through the corresponding selector sections 42a to 42n. For this reason, the media need not be shared, and the output and input transfer rates of each input accommodation units and each output accommodation unit can be increased up to the medium transfer rate.

In addition, in each of the input accommodation units 1a to 1n, the plurality of data transfer sections 12A and 12a and the plurality of input controllers 13A and 13a are independently arranged. A plurality of transfer requests having different transfer destinations from the same input accommodation unit as one of the input accommodation units 1a to 1n are individually selected by the selecting sections 31a to 31n. As shown in FIG. 11, for example, even if the transfer request 5bf from the input accommodation unit 1b which has the output accommodation unit 2f as the transfer destination is queued in the selecting section 31f, the transfer request 5bh from the same input accommodation unit 1b is selected by another selecting section 31h, thereby transferring the data from the memory 11. Therefore, data can be more efficiently transferred.

The mask registers for masking the transfer requests are arranged at the inputs of the selecting sections 31a to 31n. The transfer requests from the input accommodation units 1a to 1n serving as the transfer sources are masked until the end of data transfer corresponding to a transfer permission if this transfer permission is output from the corresponding selecting section. When individual transfer requests for a plurality of data are to be output, complicated transfer request control in each input accommodation unit, such as a temporary stop of other transfer requests in association with the transfer permission of any one of the transfer requests can be omitted.

In addition, the controller 30 is arranged in the switch controller 3 to monitor all the transfer requests. If any transfer request is output, a transfer request selection instruction is output, in a predetermined order, from the selecting sections 31a to 31n determined in a predetermined order to each of the selecting sections 31a to 31n. Therefore, stable arbitration processing can be performed without being localized in some selecting sections in the switch controller.

As described above, according to the present invention, a switch control means for selecting one of transfer requests for the same transfer destination from all the transfer requests output from the input accommodation units is arranged to output a selector control signal on the basis of the selected transfer request. The switch control means also outputs a transfer permission to the transfer source. On the basis of this selector control signal, the selector switch means connects the input accommodation unit serving as the transfer source and the output accommodation unit serving as the transfer destination in a one-to-one correspondence. The data output from the transfer source is unidirectionally transferred. For this reason, the input and output accommodation units need not share a medium. The output and input transfer rates of each input accommodation unit and each output accommodation unit can be increased to the medium transfer rate. In addition, only one transfer request is selected for each output accommodation unit, and a data loss in the switch can be suppressed.

A selecting section is arranged in each output accommodation unit, and the selecting section selects any one of the transfer requests which corresponds to the output accommodation unit serving as the transfer destination. At the same time, a signal generator outputs a selector control signal on the basis of the transfer permission output from the corresponding selecting section. The selector section arranged in each output accommodation unit selects one of the data from the respective input accommodation units to a corresponding one of the output accommodation units on the basis of the selector control signal. Each output accommodation unit can be,connected to each input accommodation unit through a corresponding selector in a one-to-one correspondence with relatively small hardware.

A transfer request bus for transferring transfer requests output from the input accommodation units and a transfer permission bus for transferring transfer permissions output from the selecting sections are arranged. The transfer request and the transfer permission can be exchanged using slots time-divisionally assigned to these buses. For this reason, the number of signal lines with respect to each input accommodation unit can be reduced, thereby suppressing an increase in hardware.

Each slot is assigned for each input accommodation unit serving as a transfer source, and a transfer destination number representing the output accommodation unit serving as a transfer destination is inserted into a predetermined slot by the corresponding input accommodation unit and the corresponding selecting section, and the corresponding transfer request and transfer permission are output. The transfer source with respect to the transfer request and the transfer permission can be detected on the basis of the time position of each slot. The transfer destination with respect to the transfer request and the transfer permission can be detected using the transfer destination number inserted in the corresponding slot. In practice, only the transfer destination number is exchanged through each bus, and the information volume can be reduced. High-speed transfer control can be performed. The data transfer switch can sufficiently cope with an increase in the number of accommodation units.

Each selecting section is arranged in each corresponding output accommodation unit. The selecting sections are actually mounted in only the output accommodation units installed as needed. A predicted maximum number of selecting sections need not be prepared. Hardware can be suppressed to a scale corresponding to the actual number of accommodation units.

Each signal generator generates a selector control signal on the basis of the transfer destination number inserted in each slot of the transfer permission bus which is assigned to the corresponding input accommodation unit. The signal generator can be shared, and the signal generator need not be arranged in correspondence with each selecting section. An increase in hardware can be suppressed.

Assume that transfer requests from input accommodation units having received no transfer permissions are present in all the transfer requests for a plurality of data having different transfer destinations from the respective input accommodation units. In this case, each switch control means is arranged to select one of the transfer requests having the same transfer destination, a selector control signal is output on the basis of the selected transfer request, and at the same time, a transfer permission is output to the transfer source. On the basis of this selector control signal, the selector switch means connects each input accommodation unit serving as the transfer source and each output accommodation unit serving as the transfer destination in a one-to-one correspondence to transfer the data output from the transfer source in one direction. Even if a transfer request from an arbitrary output accommodation unit is queued due to a reason such as generation of a large number of transfer requests having any one of the output accommodation units as a transfer destination, other transfer requests from the same input accommodation unit having different transfer destinations can be selected by the corresponding selecting sections. The data from these input accommodation units can be transferred, thereby performing highly efficient data transfer.

A selecting section is arranged in each output accommodation unit, and the selecting section selects one of the transfer requests which has the corresponding output accommodation unit as the transfer destination, thereby outputting a transfer permission. At the same time, the corresponding signal generator outputs a selector control signal on the basis of the transfer permission output from the corresponding selecting section. On the basis of the transfer permission from each selecting section, of all the transfer requests input to the respective selecting sections, a transfer request from the input accommodation unit serving as a transfer source is masked by a mask register until the end of data transfer based on the transfer permission. Even if individual transfer requests for a plurality of data are to be output, complicated transfer request control in each input accommodation unit, such as a temporary stop of other transfer requests in response to the transfer permission to any one of the transfer requests, can be omitted.

In addition, a controller in the switch controller monitors all the transfer requests. If any one of the transfer requests is detected, the transfer request selection is designated in a predetermined order from the selecting sections selected in a predetermined order. Therefore, stable arbitrary processing without any localization in the selecting sections in the switch controller can be performed.

What is claimed is:

1. A data transfer switch having a plurality of input accommodation units and a plurality of output accommodation units to transfer data of an arbitrary length input from an arbitrary input accommodation unit to a predetermined output accommodation unit on the basis of transfer destination information, comprising:

switch control means for selecting one of transfer requests having the same output accommodation unit serving as a transfer destination from all transfer requests output from the input accommodation units, outputting a selector control signal instructing to select data from a transfer source input accommodation unit, as the data for transferring to a transfer destination output accommodation unit, the selector control signal designating to select data from the transfer source input accommodation unit, and outputting a transfer permission to the transfer source input accommodation unit; and selector switch means for selecting, on the basis of the selector control signal output from said switch control means, one of data output from the input accommodation units as data to be transferred to each output accommodation unit, connecting the transfer source input accommodation unit to the transfer destination output accommodation unit in a one-to-one correspondence, and transferring the data from the transfer source input accommodation unit to the transfer destination output accommodation unit in accordance with the transfer permission in one direction, said selector switch means having no memory device and having a distributor unit and a plurality of selector sections.

2. A switch according to claim 1, wherein said switch control means comprises:

a plurality of selecting sections respectively arranged for the output accommodation units to each select one of a plurality of transfer requests having corresponding output accommodation units serving as transfer destinations and to output a transfer permission to an input accommodation unit corresponding to the selected transfer request, and a plurality of signal generators for outputting the selector control signal instructing to select data from the transfer source input accommodation unit, as the data for transferring to the transfer destination output accommodation unit, designating to select data from the transfer source input accommodation unit to the transfer destination output accommodation unit on the basis of a transfer permission output from each of the plurality of selecting sections; and said selector switch means includes a distributor for distributing data output from each input accommodation unit to each output accommodation unit, and a selector section arranged for each output accommodation unit to select data to be transferred to a corresponding output accommodation unit from all data from the input accommodation unit which are distributed by the distributor.

3. A switch according to claim 1, further comprising:

a plurality of selecting sections respectively arranged for the output accommodation units to each select one of a plurality of transfer requests having corresponding output accommodation units serving as transfer destinations and to output a transfer permission to an input accommodation unit corresponding to the selected transfer request;

a timing generator for outputting frame and clock signals to a control bus;

a transfer request bus for transferring a transfer request output from each input accommodation unit; and a transfer permission bus for transferring a transfer permission output from each selecting section, so that the transfer request and the transfer permission are exchanged using slots time-divisionally assigned on the transfer request bus and the transfer permission bus;

wherein the control bus outputs frame and clock signals as control signals for the transfer request bus and the transfer permission bus.

4. A switch according to claim 3, wherein each transfer source input accommodation unit is assigned a slot, each input accommodation unit inserts a transfer destination number representing the transfer destination output accommodation unit in a home slot and outputs a transfer request, and each selecting section inserts the transfer destination number representing the transfer destination output accommodation unit in a slot of the transfer source input accommodation unit and outputs a transfer permission.

5. A switch according to claim 3, wherein each selecting section is arranged in the corresponding output accommodation units.

6. A switch according to claim 4, wherein each signal generator generates the selector control signal on the basis of the transfer destination number inserted by a corresponding one of the selecting sections in the slot on the transfer permission bus, the transfer destination number being assigned to the transfer source input accommodation unit.

7. A data transfer switch having a plurality of input accommodation units and a plurality of output accommodation units to transfer data of an arbitrary length input from an arbitrary input accommodation unit to a predetermined output accommodation unit on the basis of transfer destination information, the plurality of input accommodation units being adapted to individually output transfer requests for a plurality of data having different transfer destinations and output corresponding data in response to transfer permissions corresponding to the transfer requests, comprising:

switch control means for selecting one of transfer requests having the same output accommodation unit as a transfer destination, the transfer requests being output from input accommodation units to which transfer permissions are not notified and being selected from all transfer requests from the input accommodation units, for outputting a selector control signal instructing to select data from a transfer source input accommodation unit, as the data for transferring to a transfer destination output accommodation unit, the selector control signal designating to select data from the transfer source input accommodation unit to the transfer destination output accommodation unit, and for outputting a transfer permission to the transfer source input accommodation unit in a manner where a plurality of transfer permissions will not be given simultaneously to the transfer source input accommodation unit; and selector switch means for selecting any one of the data output from the input accommodation units as data to be transferred to each output accommodation unit, on the basis of the selector control signal from said switch control means, connecting the transfer source input accommodation unit to the transfer destination output accommodation unit in a one-to-one correspondence in response to the transfer permission, and transferring the data output from the transfer source input accommodation unit to the transfer destination output accommodation unit in one direction.

8. A switch according to claim 7, wherein said switch control means comprises:

a plurality of selecting sections respectively arranged for the output accommodation units to each select one of a plurality of transfer requests having corresponding output accommodation units serving as transfer destinations and to output a transfer permission to an input accommodation unit corresponding to the selected transfer request;

a signal generator for outputting the selector control signal instructing to select data from a transfer source input accommodation unit, as the data for transferring to the transfer destination output accommodation unit, designating to select data from the transfer source input accommodation unit to the transfer destination output accommodation unit on the basis of a transfer permission output from each of the plurality of selecting sections; and a mask register for masking the transfer request from the transfer source input accommodation unit having received the transfer permission, the transfer request being selected from the transfer requests input to the selecting units, until an end of data transfer corresponding to the transfer permission.

9. A switch according to claim 7, wherein said switch control means comprises a controller for monitoring all transfer requests, and when any one of the transfer requests is detected, selecting and designating transfer requests in a predetermined order from selecting sections selected in a predetermined order.

* * * * *

UNITED STATES PATENT AND TRADEMARK OFFICE
CERTIFICATE OF CORRECTION

PATENT NO. : 5,881,065
DATED : March 9, 1999
INVENTOR(S) : Abiru

It is certified that error appears in the above-identified patent and that said Letters Patent is hereby corrected as shown below:

In column 16, line 39, delete "can be,connected" and insert -- can be connected -- .

Signed and Sealed this

Twenty-first Day of November, 2000

Attest:

Q. TODD DICKINSON

*Attesting Officer*   *Director of Patents and Trademarks*